United States Patent [19]

Rawlings et al.

[11] 4,066,617

[45] Jan. 3, 1978

[54] STABILIZED POLY(ALKYLENE TEREPHTHALATES)

[75] Inventors: Herbert L. Rawlings; Arthur L. Baron, both of New Martinsville, W. Va.

[73] Assignee: Mobay Chemical Corporation, Pittsburgh, Pa.

[21] Appl. No.: 716,601

[22] Filed: Aug. 23, 1976

Related U.S. Application Data

[63] Continuation-in-part of Ser. No. 642,841, Dec. 22, 1975, abandoned.

[51] Int. Cl.$^2$ .............................................. C08K 5/15
[52] U.S. Cl. .................... 260/45.8 A; 260/45.7 P; 260/45.7 PH; 260/45.8 R
[58] Field of Search ............ 260/45.8 A, 40 R, 45.8 R

[56] References Cited

U.S. PATENT DOCUMENTS

| | | | |
|---|---|---|---|
| 2,437,232 | 3/1948 | Rothrock et al. | 260/45.7 PH |
| 3,305,520 | 2/1967 | Fritz et al. | 260/45.7 PH |
| 3,398,212 | 8/1968 | Jackson et al. | 260/860 |
| 3,489,716 | 1/1970 | Calkins | 260/45.8 A |
| 3,516,957 | 6/1970 | Gray et al. | 260/22 |
| 3,794,629 | 2/1974 | Eimers et al. | 260/45.8 A |
| 3,886,104 | 5/1975 | Borman et al. | 260/22 EP |

OTHER PUBLICATIONS

Goodman et al.; Polyesters; vol. 1, 1965; pp. 1–3.

*Primary Examiner*—Lewis T. Jacobs
*Attorney, Agent, or Firm*—Gene Harsh; Lawrence S. Pope; Frederick H. Colen

[57] ABSTRACT

Poly(alkylene terephthalates) are stabilized during high temperature processing by neutral esters of phosphorous acid having at least one oxetane group. The stabilized poly(alkylene terephthalates) are resistant to molecular weight degradation and discoloration during melt processing of the polymer when the polymer is being extruded and formed into molded articles.

14 Claims, No Drawings

STABILIZED POLY(ALKYLENE TEREPHTHALATES)

This is a continuation-in-part of our copending application Ser. Number 642,841, filed Dec. 22, 1975, now abandoned.

BACKGROUND OF THE INVENTION

1. Field of the Invention

This invention relates to poly(alkylene terephthalate) polymers and more particularly to poly(alkylene terephthalate) polymers having stability at elevated temperatures.

2. Description of the Prior Art

Poly(alkylene terephthalate) polymers particularly poly(butylene terephthalate) and poly(ethylene terephthalate) are utilized in molding articles by thermoplastic molding techniques. In processing the poly(alkylene terephthalate) high temperatures are encountered in melting, extruding and forming the polymer which contributes to discoloration making the poly(alkylene terephthalate) molded articles unappropriate for the manufacture of articles which are to be color constant. Further, because of the heating necessary to process the polymer, the poly(alkylene terephthalate) undergoes molecular weight reduction causing a deterioration in the physical and mechanical properties of the molded article.

In the synthesis of poly(alkylene terephthalates) linear alkyl phosphites have been used to prevent discoloration of the polymer. The color stability problem during synthesis and the stability problem during processing present different problems to the corresponding manufacturers. The poly(alkylene terephthalate) is typically synthesized in an inert atmosphere and discoloration is due to the heat necessary to perform the esterification or transesterification of the monomers. Whereas during melt processing the polymer is subjected to both heat and air which has made the linear alkyl phosphites ineffective for stabilizing poly(alkylene terephthalates).

In accordance with the present invention poly(alkylene terephthalate) polymers are provided with improved resistance to color and molecular weight degradation during melt processing.

BRIEF DESCRIPTION OF THE INVENTION

Poly(alkylene terephthalate) thermoplastic polymers are provided with improved resistance to heat induced color and molecular weight degradation by the addition of an effective amount of a neutral ester of phosphorous acid with at least one oxetane group thereon (hereinafter referred to as oxetane phosphites).

DETAILED DESCRIPTION OF THE INVENTION

The oxetane phosphites useful in the practice of the invention are for example tris-[(3-ethyl-oxetanyl-3)-methyl]-phosphite, tris-[(3-pentyloxetanyl-3)-methyl]-phosphites, phenyl-bis-[(3-ethyloxetanyl-3)-methyl]-phosphite, 2-phenoxy-spiro (1,3,2-dioxaphosphorinane-5,3'-oxetane) and 3,3-bis-[spiro(oxetane-3',5''-(1'',3'', 2''-dioxaphosphorinane-2'')-oxy-methyl]-oxetane, as well as those disclosed in U.S. Pat. No. 3,209,013, column 1, line 28 to column 3, line 10 incorporated herein by reference.

Thus a preferred group of oxetane phosphites is those of the formulae:

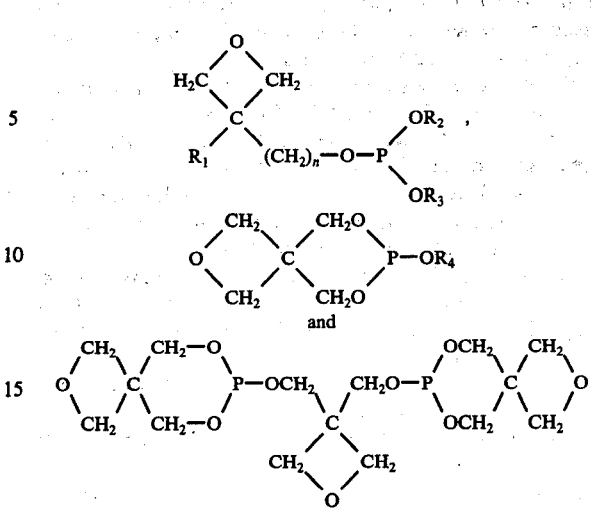

where $n$ is selected from the group consisting of 0 and 1, $R_1$ is selected from the group consisting of alkyl, aryl, aralkyl, halomethyl, cyanomethyl, alkoxymethyl, aryloxymethyl, aralkyloxymethyl and acyloxymethyl, $R_2$ and $R_3$ are

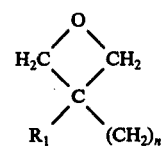

or alkyl, aryl, aralkyl, haloaryl, and $R_4$ is alkyl, aryl, aralkyl, haloaryl or

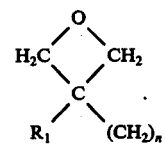

Preferably, $n$ is 1. Preferably, in Formula 1 all three ester groupings attached to the phosphorus atom are the same. $R_1$ is preferably lower alkyl or halo lower alkyl.

A particularly useful oxetane phosphite in stabilizing the poly(alkylene terephthalates) is tris(3-ethyl-3-methyl oxetane) phosphite and is represented by the structural formula:

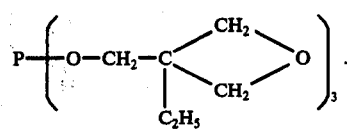

Combinations of the oxetane phosphite may also be utilized in stabilizing the poly(alkylene terephthalates) of the invention.

The level of oxetane phosphite needed to stabilize the poly(alkylene terephthalate) is dependent on the amount of phosphorus in the particular oxetane phosphite. Based on the phosphorus level of the oxetane phosphite 0.0013% to 0.0168% by weight of phosphorus is necessary to stabilize the poly(alkylene terephthalate) polymer and more preferably 0.0021% to 0.0084%. Based on the weight of the total oxetane phosphite 0.015 to 0.2% and more preferably 0.024 to 0.1% based on the weight of the poly(alkylene terephthalate) polymer is necessary for adequate stability.

The oxetane phosphites can be prepared by methods disclosed in U.S. Pat. No. 3,209,013 incorporated herein by reference. Although the oxetane phosphites have been used to stabilize polyvinylchloride and polycarbonate (see U.S. Pat. Nos. 3,794,629 and 3,209,013) they have not heretofore been used to stabilize the poly(alkylene terephthalates) as herein disclosed.

The poly(alkylene terephthalates) to be stabilized are those which are used in molding applications such as poly(ethylene terephthalate) and poly(butylene terephthalate). Although poly(ethylene terephthalate) has been used in molded articles by far poly(butylene terephthalate) has found the most extensive use in this area.

Poly(alkylene terephthalate) is synthesized by either the direct esterification of terephthalic acid and the appropriate alkylene diol or by the transesterification of dimethyl terephthalate with the appropriate alkylene diol. In the case of poly(butylene terephthalate) the reaction sequence is as follows:

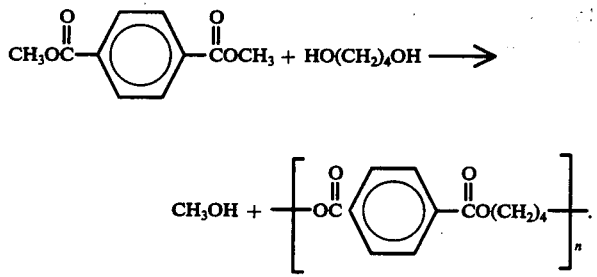

The stoichiometry of the 1,4-butylene glycol to the dimethyl terephthalate and the reaction time is adjusted to obtain the desired degrees of polymerization for adequate molding properties of the polymer. Preferably a minimum intrinsic viscosity of 0.6 measured at 25° C as a 0.1% solution in ortho-chlorophenol is necessary to obtain an adequate article formed from poly(butylene terephthalate). The upper molecular weight is dependent upon processing equipment however a maximum intrinsic viscosity for the poly(butylene terephthalate) is about 1.5 at 25° C in a 0.1% solution with ortho-chlorophenol.

Poly(ethylene terephthalate) is synthesized in much the same manner as the poly(butylene terephthalate) except ethylene glycol is substituted for butylene glycol. The intrinsic viscosity of the poly(ethylene terephthalate) should be between 0.5 to 0.8 as above measured and more preferably between 0.6 and 0.7.

The invention can be further understood by the following examples.

EXAMPLE I

A poly(butylene terephthalate) polymer having an intrinsic viscosity of 1.2 measured in a 0.1% solution in o-chlorophenol at 25° C was admixed with tris(3-ethyl-3-methylol oxetane) phosphite represented by the structural formula:

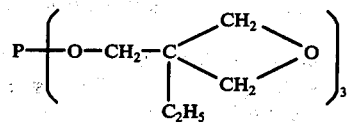

The homogeneous admixture was formed by melt extrusion in a single screw extruder. The above composition was tested for stability by extrusion through a capillary rheometer at 250° C. The extrusion temperature was above the melting point of the polymer. The time necessary for a given weight of polymer to flow through the capillary rheometer after various pre-conditioning time intervals was measured and the melt flow half life was calculated. The melt flow half life was an extrapolated value representing the time necessary to degrade the poly(butylene terephthalate) at 250° C to the extent that the extrusion rate would be double that of a five minute treatment period. The longer the melt flow half life is, the more stable is the poly(butylene terephthalate). The results of the tests for melt flow half life are reported in Table I.

EXAMPLES II-VI

Examples III-VI were prepared as was described in Example I, except that various phosphites other than oxetane phosphites were used as additives. The phosphites in Examples III-VI are phosphites which are conventionally used as stabilizers in thermoplastic polymers. Example II was a control having no stabilizer therein except a nominal amount for providing stability in the synthesis of the polymer. The control was the base polymer for all of Examples I and III through VI. The results of the testing of Examples II through VI are reported in Table I.

TABLE I

| Example | Phosphite | Concentration parts phosphite/hundred parts polymer | Concentration parts P/hundred parts polymer | Melt Flow Half Life (min) |
|---|---|---|---|---|
| I | Tris(3-ethyl-3-methylol oxetane) phosphite | 0.08 | 0.0062 | 40.5 |
| II | None | | | 33 |
| III | Mixture of decyl diphenyl phosphite and an aliphatic carbonate containing tetrahydrofuran groups | 0.22 | 0.0062 | 18.5 |
| IV | Distearyl pentaerythritol diphosphite | 0.07 | 0.0062 | 25 |
| V | Diisodecyl pentaerythritol diphosphite | 0.05 | 0.0062 | 26 |
| VI | Tri(mixed mono and dinonyl phenyl) phosphite | 0.11 | 0.0062 | 22 |

In Examples I through VI, the level of stabilizer was based on the amount of phosphorus added to the poly(butylene terephthalate) polymer. Thus all of the phosphites other than the oxetane phosphites contributed to the deterioration of the polymer.

EXAMPLE VII

Example I was repeated except that a poly(butylene terephthalate) having an intrinsic viscosity of 0.82 was used for testing. Further the poly(butylene terephthalate) was tested for color change (APHA color) after contact with heat and air at 250° C for 3½ hrs. Yellowness was tested by exposing molded plaques for 3 weeks to 165° C. air. The plaques were molded from unaged poly(butylene terephthalate) polymer. The test results are reported on Table II.

EXAMPLES VIII AND IX

Example VII was repeated except in Example VIII no phosphite was added and in Example IX a mixture of a diaryl, monoaryl phosphite in an aliphatic carboxylate containing oxetane groups was admixed with the poly(butylene terephthalate). The results of these tests are reported in Table II.

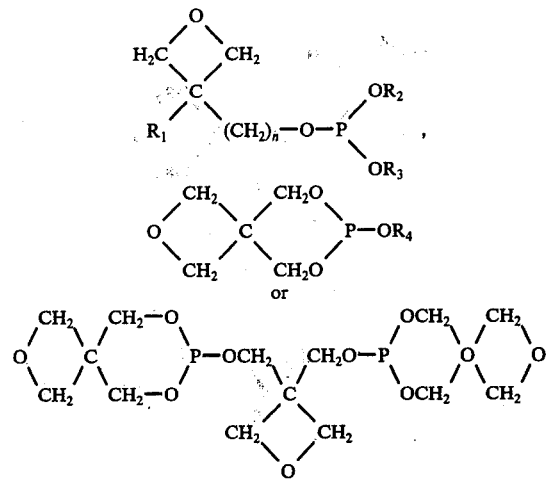

TABLE II

| Example | Phosphite | Concentration parts phosphite/hundred polymer | Melt Flow Half Life (min) | Melt Color 250° C for 3½ hrs. APHA | Yellowness[1] Index Original | Aged |
|---------|-----------|----------------------------------------------|---------------------------|------------------------------------|-------------------------------|------|
| VII | Tris(3-ethyl-3-methylol oxetane) phoshite | 0.08 | 95 | 550 | 9.3 | 28.5 |
| VIII | None | — | 81.0 | 850 | 14.4 | 30.3 |
| IX | Mixture of a decyl diphenyl phosphite and an aliphatic carbonate containing tetrahydrofuran groups | 0.22 | 53.5 | 1000 | 11.9 | 33.1 |

[1]Tested in accordance with ASTM D-1925-63T.

In both the APHA color test and the Yellowness Index color test the lower the number is the better the color is.

Examples VII through IX are demonstrative of the improved color properties obtained by the use of an oxetane phosphite in a poly(alkylene terephthalate) polymer.

The admixture of the oxetane phosphites and the poly(alkylene terephthalate) may also contain fillers, dyestuffs and/or pigments without influencing the effect of reduced degradation of the polymer provided by the oxetane phosphite.

The invention has been described with reference to specific materials and blending techniques for purposes of illustration only. Thus, the invention is not to be limited by these details but as is set forth in the accompanying claims.

What is claimed is:

1. A stabilized polymeric molding material comprising:
   a poly(alkylene terephthalate); and,
   a stabilizing amount of a neutral ester of phosphorous acid with at least one oxetane group.

2. The material of claim 1 wherein said poly(alkylene terephthalate) is poly(butylene terephthalate).

3. The material of claim 2 wherein said poly(butylene terephthalate) has an intrinsic viscosity of 0.6 to 1.5

4. The material of claim 3 wherein said poly(butylene terephthalate) has an intrinsic viscosity of 0.75 to 1.3.

5. The material of claim 2 wherein said ester of phosphorous acid is represented by the structural formula:

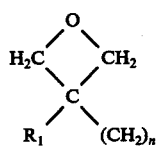

where $n$ is 0 or 1, $R_1$ is selected from the group consisting of alkyl, aryl, aralkyl, halomethyl, cyanomethyl, alkoxymethyl, aryloxymethyl, aralkyloxymethyl and acyloxymethyl, and $R_2$, $R_3$ and $R_4$ are selected from the group consisting of

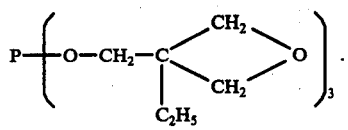

alkyl, aryl, aralkyl and haloaryl.

6. The material of claim 5 wherein said ester of phosphorous acid is tris(3-ethyl-3-methyl oxetane) phosphite and is represented by the structural formula:

7. The material of claim 1 wherein said ester of phosphorous acid is present at a level of 0.0013 to 0.0168% by weight based on the weight of phosphorus in said material.

8. The material of claim 1 wherein said poly(alkylene terephthalate) is poly(ethylene terephthalate).

9. The material of claim 8 wherein said poly(ethylene terephthalate) has an intrinsic viscosity of 0.6 to 0.9.

10. The material of claim 8 wherein said ester of phosphorous acid is represented by the structural formula:

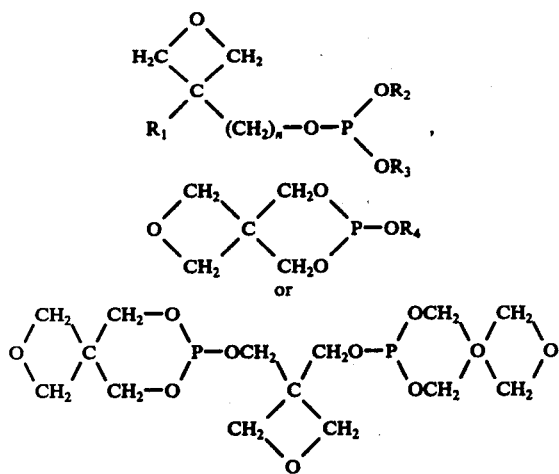

where *n* is 0 or 1, $R_1$ is selected from the group consisting of alkyl, aryl, aralkyl, halomethyl, cyanomethyl, alkoxymethyl, aryloxymethyl, aralkyloxymethyl and acyloxymethyl and $R_2$, $R_3$ and $R_4$ are selected from the group consisting of

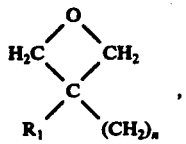

alkyl, aryl, aralkyl and haloaryl.

11. The material of claim 10 wherein said ester of phosphorous acid is tris(3-ethyl-3-methyl oxetane) phosphite and is represented by the structural formula:

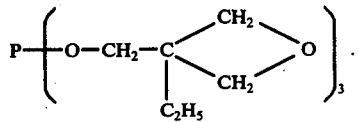

12. In a poly(alkylene terephthalate) based polymer capable of being thermoplastically molded, the improvement comprising:
a stabilizing amount of a neutral ester of phosphorous acid with at least one oxetane group being in admixture with said poly(alkylene terephthalate) polymer.

13. The poly(alkylene terephthalate) based polymer of claim 12 wherein said phosphorous acid ester is present from 0.015 to 0.2% by weight based on the weight of said polymer.

14. The poly(alkylene terephthalate) of claim 12 wherein said phosphorous acid ester is represented by the structural formula:

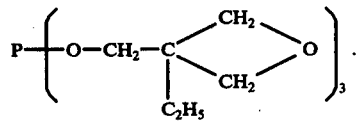

* * * * *